United States Patent [19]
McClure et al.

[11] 3,887,198
[45] June 3, 1975

[54] PRESSURE BALANCED RING SEAL

[75] Inventors: William M. McClure, East Peoria; Keith K. Klintworth, Peoria, both of Ill.

[73] Assignee: Caterpillar Tractor Co., Peoria, Ill.

[22] Filed: Oct. 26, 1973

[21] Appl. No.: 409,792

[52] U.S. Cl. .................. 277/27; 277/173; 277/177; 277/94
[51] Int. Cl. ............................................. F16j 15/16
[58] Field of Search ..... 277/27, 177, 173, 94, 81 R, 277/DIG. 8

[56] References Cited
UNITED STATES PATENTS

| | | | |
|---|---|---|---|
| 2,221,225 | 11/1940 | Weis et al. | 277/3 X |
| 2,402,033 | 6/1946 | Flinn | 277/173 X |
| 2,444,119 | 6/1948 | Thorn et al. | 277/177 |
| 3,392,984 | 7/1968 | Reinsma et al. | 277/96 |
| 3,499,653 | 3/1970 | Gardner | 277/27 |
| 3,529,838 | 9/1970 | Singleton | 277/27 |

*Primary Examiner*—Samuel B. Rothberg
*Attorney, Agent, or Firm*—Phillips, Moore, Weissenberger, Lempio & Strabala

[57] ABSTRACT

A ring seal is mounted on a shaft for rotation within a bore formed in a housing. Side faces of the ring seal are tapered slightly to converge towards an inner face thereof so that the fluid forces acting on the ring seal are substantially balanced.

14 Claims, 5 Drawing Figures

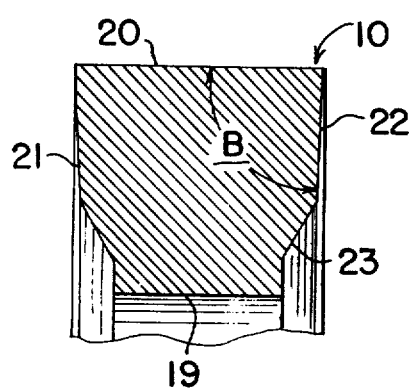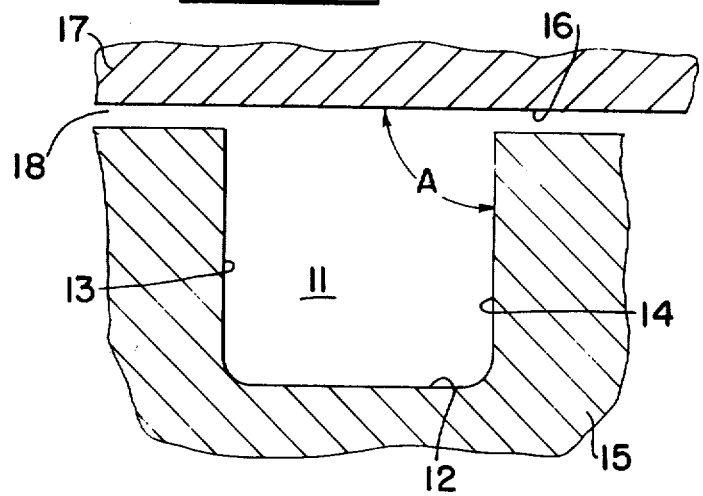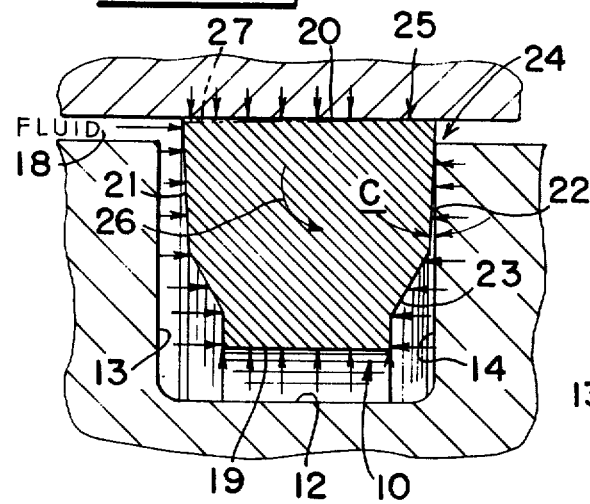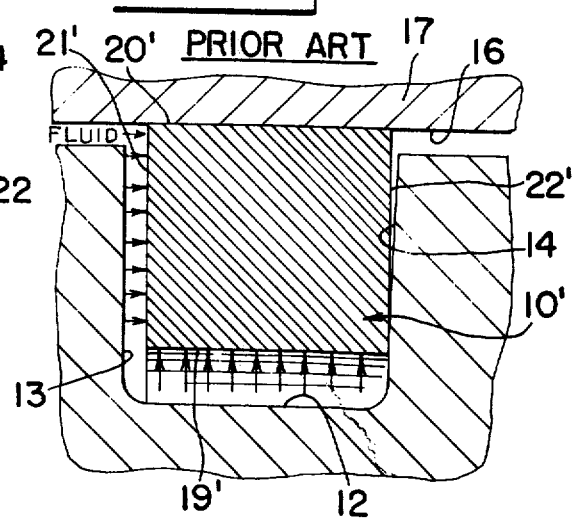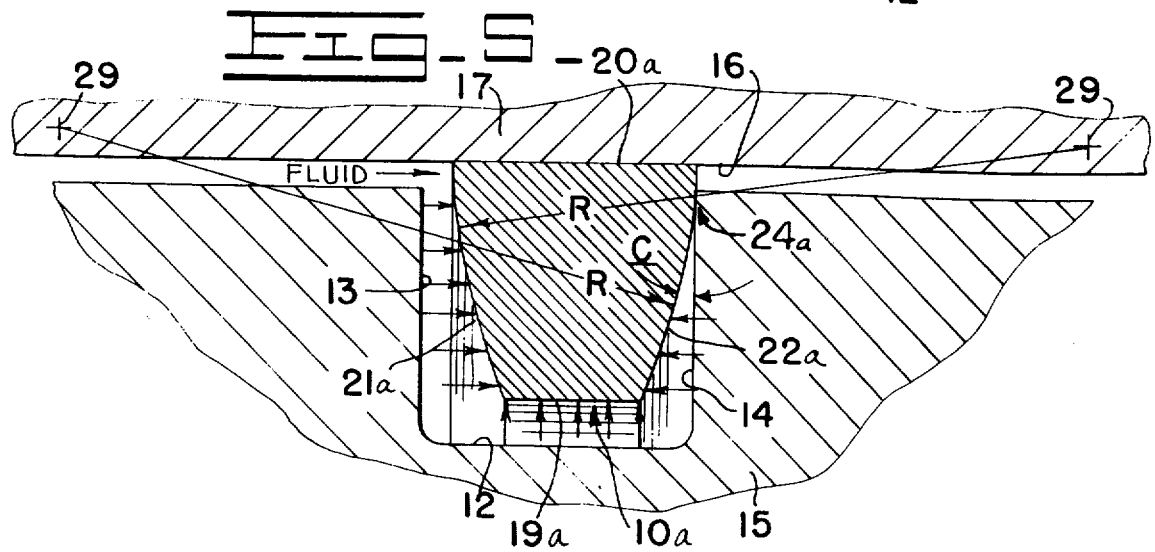

PRESSURE BALANCED RING SEAL

BACKGROUND OF THE INVENTION

This invention relates to a rotating ring seal employed in power transmission devices.

The use of rotary ring seals in power transmission devices has gained increasing prominence to facilitate smooth operation of large machines. Such ring seals are normally employed to seal joints wherein a combination of speed, pressure and size made other types of seals impractical. Where speeds and pressures are high, many costly plating processes and surface finishes have been employed in order to extend seal life.

Conventional ring seals of rectangular cross section are normally mounted in a like shaped groove. Substantially large and unbalanced pressure areas are thus provided on side faces of the ring seal to promote large areas of surface contact. Such areas substantially increase the frictional contact between the ring seal and the parts it seals to promote undue wear as well as substantial power losses.

SUMMARY OF THE INVENTION

The dynamic ring seal of this invention is provided with at least one tapered side face to provide a substantial "pressure balance" across the four faces thereof. The ring seal will thus engage, in limited bearing relationship, an accommodating bore surface and an adjacent outer surface of an accommodating groove to thereby maintain friction, heat, wear and power losses at a minimum.

BRIEF DESCRIPTION OF THE DRAWINGS

FIG. 1 is a partial cross sectional view through a ring seal embodying this invention;

FIG. 2 is a partial cross sectional view of a shaft, adapted to accommodate the FIG. 1 seal in a groove thereof, rotatably mounted in a housing;

FIG. 3 is a similar cross sectional view, but illustrating the FIG. 1 ring seal assembled in the FIG. 2 structure;

FIG. 4 is a view similar to FIG. 3, but illustrating a conventional ring seal assembly; and FIG. 5 is a view similar to FIG. 3, but illustrating a modified ring seal assembly of this invention.

DETAILED DESCRIPTION

Referring to FIGS. 1-3, a ring seal 10 of this invention is mounted in an annular groove 11 having an inner wall 12 and side walls 13 and 14. The groove is formed in a first member 15, such as a shaft, mounted for relative rotation in a bore 16 of a second member 17, such as a stationary housing. The primary purpose of the ring seal is to seal-off hydraulic fluid, originating in a radical clearance 18 between the housing and shaft, on the high pressure side thereof (denoted "fluid" in FIG. 3). The groove is ideally formed with a right angle A, but usual methods of manufacture result in an acute angle A, ranging from 89° to 90°, between each opposing side wall 13 and 14 and bore 16.

Referring to FIG. 1, ring seal 10 comprises inner and outer faces 19 and 20, respectively, joined together by side faces 21 and 22. At least one side face is tapered to converge toward inner face 19 and has a side relief 23. In actual practice, both side faces are preferably formed alike so that directional orientation during assembly is not required. An included acute angle B (preferably selected from the approximate range of from 85.0° to 88.5°, between the seal's outer and side faces 20 and 21, has a maximum value which is slightly less than angle A. The ring seal is preferably made from a homogenous material, such as a suitably composed metallic alloy or a filled high temperature plastic material, preferably having suitable friction and mechanical properties to enable it to "heal over" areas whereat wear occurs due to loading thereof.

Referring to FIG. 3, the ring seal is "pressure balanced" across substantially all of its outer face 20 and its side face 22. As a result, the net unbalanced force resulting from the sealed hydraulic fluid is much less than that normally developed against a conventional ring seal, such as the one illustrated in FIG. 4. Because of its angled or tapered side face 22, the ring seal will generate less heat, waste less power and perform well with less end clearance, since there is less circumferential growth due to thermal expansion.

In particular, a conventional ring seal 10', shown in FIG. 4, has a rectangular cross section whereby hydraulic fluid pressure (denoted by small arrows) acts on its inner and left hand faces 19' and 21', respectively. Such pressure thus forces outer face 20' of the ring seal against the wall of a bore 16 and a right hand face 22' against side wall 14 of the groove. The ring seal thus has unbalanced hydraulic pressure acting across substantially all of its width and radial thickness.

Referring again to FIG. 3, when outer face 20 initially seats against the surface defining bore 16, line contact will occur at 24, between side face 22 and the outer edge of sidewall 14, as members 15 and 17 rotate relative to each other. Continued rotation of such members will cause the line of contact to widen radially to thus reduce the contact stresses occasioned therebetween until the worn area of contact on the ring functions to reduce the wear rate to approximately zero.

A similar wear occurs on the ring seal's outer corner 25 in fluid applications wherein the ring seal tends to twist in operation, as depicted by arrow 26, whereby outer face 20 assumes the position depicted by phantom line 27. In either case, the areas of rubbing contact are relatively narrow after break-in in that the ring seal will automatically produce the minimum bearing area needed to carry the predetermined load to thus maintain heat generation and power loss at a minimum.

Hydraulic fluid, contaminated with abrasive materials, will normally accelerate wear of the rotating ring seal. Relief 23 on ring seal 10 functions to limit the radial width of the worn surface on face 22 at area 24 to less than the radial ring thickness as long as the depth of wear is less than the depth of relief 23. Within that wear range, heat generation and power loss will be less than with the conventional ring 10'.

FIG. 5 illustrates a modified ring seal 10a having curved side faces 21a and 22a. The side faces extend radially outwardly in diverging relationship from a flat inner face 19a to a flat outer face 20a to generally assume a frusto-conically shaped cross section. The side faces may be defined by radii R, having their centers at 29.

The outer portion of the arcuate side face 22a, adjacent the outer edge of side wall 14 of the groove, functions in the same manner as tapered side face 22 of ring seal 10. The remaining, relieved portion of the side wall functions similar to relief 23 of ring seal 10.

The slight angle C (preferably selected from the approximate range of from 0.5° to 5°, between ring faces 22 and 22a and their respective side walls 14 (FIGS. 4 and 5) also assists in continuously "pumping" a small amount of fluid into contact zones 24 and 24a to provide lubrication thereat and to dissipate heat thereat. Such "pumping" action primarily results from the pressure differential occasioned across the above-described contact areas and the slight radial oscillation occurring between the ring and the groove due to run-out as members 15 and 17 rotate relative to each other.

Some relative motion is also desirable between outer faces 20 and 20a and respective bores 16 to maintain the friction coefficient between the ring and bore closer to dynamic values than to static. Thus, the force that side wall 14 must exert on ring face 22 or 22a to move the ring axially to accommodate run-out and relative axial movement is minimized.

What is claimed is:

1. A rigid annular ring seal comprising, when viewed in cross section, radially spaced inner and outer faces joined together by axially spaced side faces, at least a substantial portion of at least one of said side faces being completely tapered circumferentially therearound and radially inwardly from said outer face toward said inner face to form an acute angle with respect to said outer face which is slightly less than 90°, said first member being rotatably mounted in a bore formed in a second member, said ring seal freely seated in unsecured relationship in an annular groove formed in said first member to position its outer face closely adjacent to annular surface portions forming said bore to maintain an annular portion of said tapered side face in sealing contact with only an outer portion of a side wall of said groove, located adjacent to said bore, and to fully expose said inner face and said side faces to pressurized fluid, said tapered side face being disposed to diverge radially inwardly with respect to said side wall, toward said inner face.

2. The ring seal of claim 1 wherein said acute angle is selected from the range of from 85.0° to 88.5°.

3. The ring seal of claim 1 wherein each of said side faces is tapered to form an acute angle with respect to said outer face which is less than 90°.

4. The ring seal of claim 1 further comprising means forming a relief therein disposed between said tapered side face and said inner face.

5. The ring seal of claim 1 wherein said tapered side face is at least substantially flat.

6. The ring seal of claim 1 wherein said tapered side face is convex.

7. The ring seal of claim 6 wherein said arcuate side face is formed by a radius and extends between said inner and outer faces.

8. The ring seal of claim 1 wherein said first member comprises a shaft rotatably mounted in said second member.

9. In a power transmission device comprising a shaft rotatably mounted in a bore formed in a member and a rigid annular ring seal, having radially spaced inner and outer faces joined together by axially spaced first and second side faces when viewed in cross section, freely mounted in unsecured relationship in an annular groove formed in said shaft to form a seal between said shaft and said member to seal-off pressurized fluid emanating at the first side face of said ring seal, the invention comprising means formed on the second side face of said ring seal for inducing a substantial balance of fluid forces around said seal and to induce a limited area of sealing contact only between an outer portion of said second side face and an outer portion of a side wall of said groove, located adjacent to said bore, said inner face and said side faces being exposed to pressurized fluid and wherein said means comprises a taper formed on said second side face which is disposed to diverge radially inwardly with respect to said side wall toward said inner face at an angle therebetween selected from the approximate range of from 0.5° to 5°.

10. The power transmission of claim 9 wherein each of said first and second side faces is tapered.

11. The power transmission of claim 10 further comprising means forming a relief in said second side face disposed between said tapered side face and said inner face.

12. The power transmission of claim 10 wherein said tapered side face is at least substantially flat.

13. The ring seal of claim 10 wherein said tapered side face is convex.

14. The ring seal of claim 13 wherein said arcuate side face is formed by a radius and extends entirely between said inner and outer faces.

* * * * *